United States Patent
Hamilton, II et al.

(10) Patent No.: US 10,699,282 B2
(45) Date of Patent: Jun. 30, 2020

(54) METHOD AND SYSTEM FOR AUTOMATIC OPTIMAL ADVERTISING DETERMINATION WITHIN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Anne R. Sand, Peyton, CO (US); Keith R. Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3139 days.

(21) Appl. No.: 12/186,266

(22) Filed: Aug. 5, 2008

(65) Prior Publication Data

US 2010/0036718 A1    Feb. 11, 2010

(51) Int. Cl.
*G06Q 30/02*    (2012.01)

(52) U.S. Cl.
CPC ......... *G06Q 30/02* (2013.01); *G06Q 30/0241* (2013.01)

(58) Field of Classification Search
None
See application file for complete search history.

(56) References Cited

U.S. PATENT DOCUMENTS

| | | | |
|---|---|---|---|
| 6,036,601 A | 3/2000 | Heckel | |
| 6,070,149 A | 5/2000 | Tavor et al. | |
| 6,118,456 A | 9/2000 | Cooper | |
| 6,256,043 B1 | 7/2001 | Aho et al. | |
| 6,329,986 B1 | 12/2001 | Cheng | |
| 6,396,509 B1 | 5/2002 | Cheng | |
| 6,738,065 B1 | 5/2004 | Even-Zohar | |
| 6,801,930 B1 | 10/2004 | Dionne et al. | |
| 6,845,486 B2 | 1/2005 | Yamada et al. | |
| 6,928,414 B1 | 8/2005 | Kim | |
| 6,954,728 B1 | 10/2005 | Kusumoto et al. | |
| 6,968,315 B1 | 11/2005 | Nakisa | |
| 6,981,220 B2 | 12/2005 | Matsuda | |
| 7,054,831 B2 | 5/2006 | Koenig | |
| 7,076,445 B1 | 7/2006 | Cartwright | |
| 7,184,047 B1 | 2/2007 | Crampton | |
| 7,210,104 B2 | 4/2007 | Nakagawa et al. | |
| 2001/0020955 A1 | 9/2001 | Nakagawa et al. | |
| 2002/0040327 A1 | 4/2002 | Owa | |
| 2002/0138607 A1 | 9/2002 | O'Rourke et al. | |
| 2003/0005439 A1 | 1/2003 | Rovira | |
| 2003/0126035 A1* | 7/2003 | Kake et al. | 705/26 |
| 2004/0030741 A1 | 2/2004 | Wolton et al. | |
| 2004/0064351 A1 | 4/2004 | Mikurak | |
| 2004/0143495 A1 | 7/2004 | Koenig | |

(Continued)

*Primary Examiner* — Daniel M Sorkowitz
(74) *Attorney, Agent, or Firm* — Brian Restauro; Andrew M. Calderon; Roberts Calderon Safran & Cole, P.C.

(57) ABSTRACT

A method implemented in a computer infrastructure having computer executable code includes receiving advertising criteria, collecting advertisement cost data, and detecting virtual universe (VU) data. Additionally, the method includes determining optimal advertisement parameters based on the advertising criteria, the advertisement cost data and the VU data, and at least one of displaying the optimal advertisement parameters and invoking an advertisement in the VU in accordance with the optimal advertisement parameters.

27 Claims, 5 Drawing Sheets

| Advertisement Type | Advertisement Location UUID | Advertisement Cost | Advertisement Impact Factor | Advertisement Impact/Cost Ratio |
|---|---|---|---|---|
| Billboard | LL123456 | 0.5 | 0.08 | 0.16 |
| | LL234567 | 1 | 0.1 | 0.10 |
| | LL345678 | 2.5 | 0.2 | 0.08 |
| | LL456789 | 3 | 0.3 | 0.10 |
| | LL567891 | 4.3 | 0.3 | 0.070 |
| | LL678912 | 4.5 | 0.8 | 0.18 |
| | LL789123 | 5 | 0.6 | 0.12 |
| 3-Dimensional Animation | LL891234 | 5 | 0.6 | 0.12 |
| | LL912345 | 6 | 0.45 | 0.075 |
| | LL987654 | 7 | 0.75 | 0.107 |
| | LL876543 | 8.5 | 0.8 | 0.094 |
| | LL765432 | 9 | 0.95 | 0.106 |
| | LL654321 | 10 | 0.9 | 0.09 |
| | LL543219 | 10 | 1.0 | 0.10 |

(56) References Cited

U.S. PATENT DOCUMENTS

| | | |
|---|---|---|
| 2004/0148221 A1 | 7/2004 | Chu |
| 2004/0162759 A1 | 8/2004 | Willis |
| 2004/0193441 A1 | 9/2004 | Altieri |
| 2005/0022139 A1* | 1/2005 | Gettman et al. ............. 715/850 |
| 2005/0030309 A1 | 2/2005 | Gettman et al. |
| 2005/0086605 A1 | 4/2005 | Ferrer et al. |
| 2005/0086612 A1 | 4/2005 | Gettman et al. |
| 2005/0179685 A1* | 8/2005 | Kake et al. ................... 345/419 |
| 2006/0015904 A1 | 1/2006 | Marcus |
| 2006/0111979 A1 | 5/2006 | Chu |
| 2006/0143095 A1 | 6/2006 | Sandus et al. |
| 2006/0178968 A1 | 8/2006 | Jung et al. |
| 2006/0178975 A1 | 8/2006 | Jung et al. |
| 2006/0287105 A1 | 12/2006 | Willis |
| 2007/0061202 A1 | 3/2007 | Ellis et al. |
| 2007/0061204 A1 | 3/2007 | Ellis et al. |
| 2007/0101276 A1 | 5/2007 | Yuen |
| 2007/0118394 A1 | 5/2007 | Cahoon |
| 2007/0118420 A1 | 5/2007 | Jung et al. |
| 2007/0129148 A1 | 6/2007 | Van Luchene |
| 2007/0156509 A1 | 7/2007 | Jung et al. |
| 2008/0097813 A1* | 4/2008 | Collins et al. .................... 705/8 |
| 2008/0140479 A1* | 6/2008 | Mello et al. ...................... 705/7 |
| 2008/0177847 A1* | 7/2008 | Wilson .......................... 709/206 |
| 2008/0306817 A1* | 12/2008 | Amidon et al. ................ 705/14 |
| 2009/0055254 A1* | 2/2009 | Madhavan et al. ............ 705/14 |
| 2009/0106094 A1* | 4/2009 | DeLine et al. ................. 705/14 |
| 2009/0144267 A1* | 6/2009 | Cook et al. ....................... 707/5 |

\* cited by examiner

| Advertisement Type | Advertisement Location UUID | Advertisement Cost | Advertisement Impact Factor | Advertisement Impact/Cost Ratio |
|---|---|---|---|---|
| Billboard | LL123456 | 0.5 | 0.08 | 0.16 |
| | LL234567 | 1 | 0.1 | 0.10 |
| | LL345678 | 2.5 | 0.2 | 0.08 |
| | LL456789 | 3 | 0.3 | 0.10 |
| | LL567891 | 4.3 | 0.3 | 0.070 |
| | LL678912 | 4.5 | 0.8 | 0.18 |
| | LL789123 | 5 | 0.6 | 0.12 |
| 3-Dimensional Animation | LL891234 | 5 | 0.6 | 0.12 |
| | LL912345 | 6 | 0.45 | 0.075 |
| | LL987654 | 7 | 0.75 | 0.107 |
| | LL876543 | 8.5 | 0.8 | 0.094 |
| | LL765432 | 9 | 0.95 | 0.106 |
| | LL654321 | 10 | 0.9 | 0.09 |
| | LL543219 | 10 | 1.0 | 0.10 |

Figure 3

METHOD AND SYSTEM FOR AUTOMATIC OPTIMAL ADVERTISING DETERMINATION WITHIN A VIRTUAL UNIVERSE

FIELD OF THE INVENTION

The present invention generally relates to computer-based virtual universes, and more specifically, to a method and system for automatic determination of optimal advertising locations, methods and timing within virtual universes.

BACKGROUND OF THE INVENTION

Virtual universes (VUs) are rapidly becoming a popular part of today's culture. A VU is a computer-based simulated environment. Many VUs are represented using 3-D graphics and landscapes, and are populated by many thousands of users, known as "residents". Often, the VU resembles the real world such as in terms of physics, houses, and landscapes.

VUs are also known as metaverses and "3D Internet." Some example VUs include: SECOND LIFE®, ENTROPIA UNIVERSE®, THE SIMS ONLINE® and THERE$^{SM}$—as well as massively multiplayer online games such as EVERQUEST®, ULTIMA ONLINE®, LINEAGE® and WORLD OF WARCRAFT®. (SECOND LIFE is a registered trademark of Linden Research, Inc. in the United States and/or other countries. ENTROPIA UNIVERSE is a registered trademark of MindArk PE AB in the United States, other countries, or both. THE SIMS ONLINE and ULTIMA ONLINE are registered trademarks of Electronic Arts, Inc. in the United States, other countries, or both. THERE is a trademark of Makena Technologies, Inc. in the United States, other countries, or both. EVERQUEST is a registered trademark of Sony Corporation of America, Inc. in the United States, other countries, or both. LINEAGE is a registered trademark of NCsoft Corporation in the United States, other countries, or both. WORLD OF WARCRAFT is a registered trademark of Blizzard Entertainment, Inc. in the United States, other countries, or both.)

A VU is intended for its residents to traverse, inhabit, and interact through the use of avatars. In operation, user(s) control the avatar(s). An avatar is a graphical representation of the user, often taking the form of a cartoon-like human or other figure. The user's account, upon which the user can build an avatar, is tied to the inventory of assets the User owns. A region is a virtual area of land within the VU, typically residing on a server. Assets, avatar(s), the environment, and everything else visually represented in the VU each comprise universally unique identifiers (UUIDs) (tied to geometric data distributed to user(s) as textual coordinates), textures (distributed to user(s) as graphics files), and effects data (rendered by the user's client according to the user's preference(s) and user's device capabilities).

On-line VUs or environments present a tremendous new outlet for both structured and unstructured virtual collaboration, gaming and exploration, as well as real-life simulations in virtual spaces. These activities, along with yet to be disclosed new dimensions, in turn, provide a wide open arena for creative and new advertising methods and mechanisms. Immersive VUs, among other things, are an avenue to expose potential consumers to a company's advertising. One form of VU advertising includes the display of billboards that are rendered on the client's screen. With the astounding and continual increase in the number of users of VUs, companies are taking more interest in reaching out to VU residents through advertising. Advertising has a direct effect on a company's profitability, given its potential to drive revenue and the associated costs of providing advertisements. In the future, seamless travel among VUs will likely be possible. Just as companies create their marketing plans considering the entire Internet versus just one site, companies will create VU marketing plans across the entire VU space.

SUMMARY OF THE INVENTION

In a first aspect of the invention, a method implemented in a computer infrastructure having computer executable code comprises receiving advertising criteria, collecting advertisement cost data, and detecting virtual universe (VU) data. Additionally, the method comprises determining optimal advertisement parameters based on the advertising criteria, the advertisement cost data and the VU data and at least one of displaying the optimal advertisement parameters and invoking an advertisement in the VU in accordance with the optimal advertisement parameters.

In another aspect of the invention, a system comprises a criteria collection tool configured to receive advertising criteria, a cost determination tool configured to determine costs for one or more combinations of advertising locations, advertising times and advertising types and a VU data collection tool configured to detect virtual universe (VU) data. Additionally, the control system comprises an advertisement analysis tool configured to determine optimal advertisement parameters based on the advertising criteria, the costs and the VU data and an advertisement launch tool configured to at least one of display the optimal advertisement parameters and invoke an advertisement in the VU in accordance with the optimal advertisement parameters.

In a further aspect of the invention, a computer program product comprising a computer usable medium having readable program code embodied in the medium is provided. The computer program product includes at least one component to receive advertising criteria, determine cost data and detect virtual universe (VU) data. Additionally, the at least one component is configured to determine an optimal combination of advertising location, advertising time and advertising method based on the advertising criteria, the cost data and the VU data, and at least one of displaying the optimal combination of advertising location, time and method and invoking an advertisement in the VU in accordance with the optimal combination of advertising location, advertising time and advertising method.

In an additional aspect of the invention, a method comprises providing a computer infrastructure operable to receive advertising criteria, determine cost data and detect virtual universe (VU) data. Furthermore, the computer infrastructure is operable to determine optimal advertisement parameters based on the advertising criteria, the cost data and the VU data and at least one of display the optimal advertisement parameters and invoke an advertisement in the VU in accordance with the optimal advertisement parameters.

BRIEF DESCRIPTION OF THE DRAWINGS

The present invention is described in the detailed description which follows, in reference to the noted plurality of drawings by way of non-limiting examples of exemplary embodiments of the present invention.

FIG. 3 shows an exemplary advertisement determination results output table according to the invention.

DETAILED DESCRIPTION OF EMBODIMENTS OF THE INVENTION

The present invention generally relates to computer-based virtual universes, and more specifically, to a method and system for automatic determination of optimal advertising locations, methods and timing within VUs. By implementing the present invention, an advertiser may dynamically determine optimal advertising locations, times and methods within a VU in order to assist with advertising decisions.

Currently, advertising methods (or types), locations and timing within a VU are determined manually. That is, users manually look at a VU location to decide if they want to place an advertisement there, what time to place the advertisement, and what type of advertisement to place. In other words, users can only take a guess of a best place, method or timing based on tacit knowledge through a manual scan of the VU.

However, VUs span massive amounts of land and are very dynamic and constantly changing environments. For example, VUs have many different areas with different types of users, activities and publicly posted events. It would be impossible for a human to manually monitor so many different locations and the changing environments within them. Thus, it is very difficult to determine an optimal location, timing and type of advertising in the VU. Better methods are required for increasing the effectiveness of VU advertisements to mange human labor and advertising costs.

This invention discloses methods and systems for automatic determination of the optimum combination of location, type and timing of one or more advertisements within a VU. In embodiments, a system may determine the recommended combinations, based on:
- advertising criteria;
- real-time and historical VU data; and
- context-sensitive data about VU environments.

Moreover, the system may analyze advertisement timings, locations and methods within a single VU or across multiple VUs.

System Environment

Figure 1:
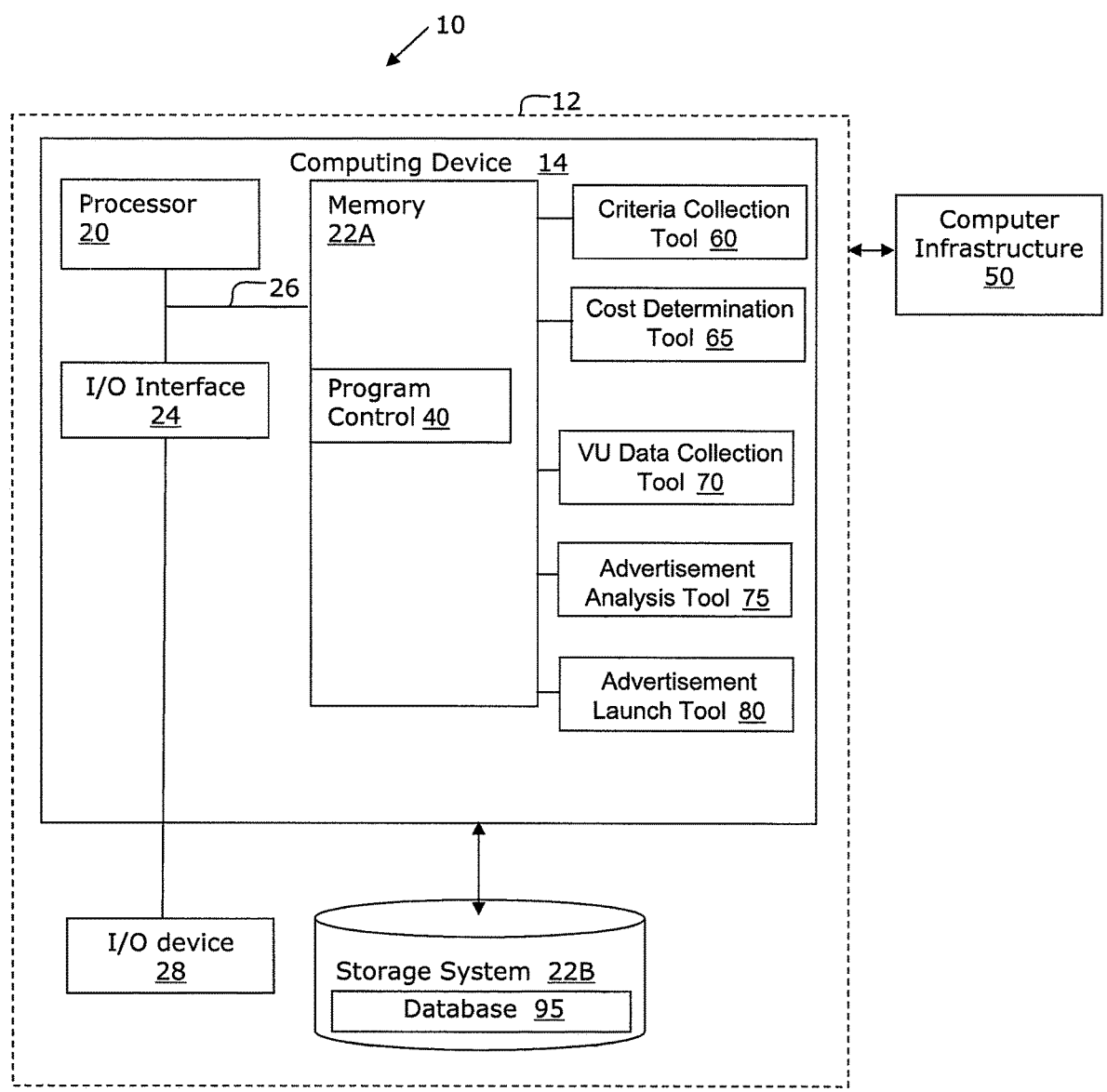
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. The computer infrastructure 12 includes a computing device 14 that comprises a criteria collection tool 60 operable to collect advertisement criteria, a cost determination tool 65 operable to determine costs for advertisements, a VU data collection tool 70 operable to collect data representative of VU parameters and conditions, an advertisement analysis tool 75 operable to automatically determine the optimum combination of location, type and timing of one or more advertisements within a VU, and an advertisement launch tool 80 operable to launch the one or more advertisements in the VU, e.g., process described herein. By implementing the present invention, a user, e.g., an advertiser, a manager of a VU or a service provider, may determine the optimum combination of location, type and timing of one or more advertisements within a VU in order to assist in advertising decisions.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution.

Further, the computing device 14 is in communication with an external I/O device/resource 28. The external I/O device/resource 28 may be keyboards, displays, pointing devices, etc. The I/O device 28 can interact with the computing device 14 or any device that enables the computing device 14 to communicate with one or more other computing devices using any type of communications link. Thus, for example, in embodiments the I/O device 28 may include a keyboard, a mouse, and a monitor, amongst other I/O devices. Additionally, in embodiments, the computing device 14 includes a storage system 22B. Storage system 22B may contain a database 95 for use by the computer infrastructure 12, as discussed further below.

The processor 20 executes computer program code (e.g., program control 40), which is stored in the memory 22A and/or the storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to the computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. In embodiments, the computer infrastructure 12 may communicate with another computer infrastructure 50, which is operating the VU. However, the invention contemplates that the computer infrastructure 12 may operate the criteria collection tool 60, the cost determination tool 65, the VU data collection tool 70, the advertisement analysis tool 75 and the advertisement launch tool 80, and also operate the VU.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Determination of Advertising Criteria

As discussed further below, the advertisement analysis tool 75 determines recommended combinations of location, method and timing of advertisements in a VU based, in part, on collected advertising criteria of an advertiser. In other words, the advertisement analysis tool 75 may determine recommended advertisement parameters based on the goals of a particular advertiser. In order to understand the goals of the advertiser and to recommend advertisements based on the advertising criteria, the criteria collection tool 60 may receive and store (e.g., in the database 95) data reflective of one or more advertiser's advertising criteria.

The advertising criteria may be established by, e.g., an advertiser in the VU, a VU manager, or a service provider. Moreover, the advertising criteria may be entered or input into the criteria collection tool 60. In embodiments, advertising criteria may include an advertiser identifier, minimum and maximum spending limits, advertising objectives, and an indication of what products/services are being sold, amongst other criteria. In embodiments, the criteria collection tool 60 may include, for example, an interface having fields for inputting an advertiser identifier, minimum and maximum spending limits. Minimum and maximum spending limits may be determined by, e.g., an advertiser and input via the criteria collection tool 60. Additionally, the spending limits may be, for example, based on particular advertisement types, or methods, e.g., billboard, 2D advertisement, 3D advertisement, animation, product placement. That is, an advertiser may have indicated or submitted different minimum and maximum spending limits for different types, or methods, of advertisements.

Additionally, in determining the advertising criteria, an advertiser may determine advertising objectives, and enter the advertising objectives via the criteria collection tool 60. In embodiments, the advertising objectives may include, for example: most impact, high cost is acceptable; most impact for given dollar amount; and lowest cost, amongst other advertising objectives. Accordingly, the criteria collection tool 60 may, for example, include an interface having click boxes (and entry fields, if necessary) for indicating the advertising objective (e.g., "most impact", "lowest cost", and "most impact for given dollar amount" (with an entry field for the amount). In alternative embodiments, the advertising objectives may be quantified via the criteria collection tool 60 on, e.g., a scale from 1-10 entered in a field or selected by a selection button, wherein 1 represents the lowest cost (lowest impact) advertisement and 10 represents the highest cost (highest impact) advertisement. In other embodiments, the advertising objectives may be quantified via the criteria collection tool 60 by a selection for impact as, e.g., "high", "medium", or "low". As should be understood, the invention contemplates other methods of indicating advertising objectives, and thus should not be limited in scope to the exemplary embodiments described herein.

Furthermore, in determining the advertising criteria, the products and/or services being advertised may be determined by the user, advertiser, etc. In embodiments, a user may input the product and/or service information into the criteria collection tool 60. For example, an advertiser may identify their product or service by keywords which describe the product or service.

Figure 2:
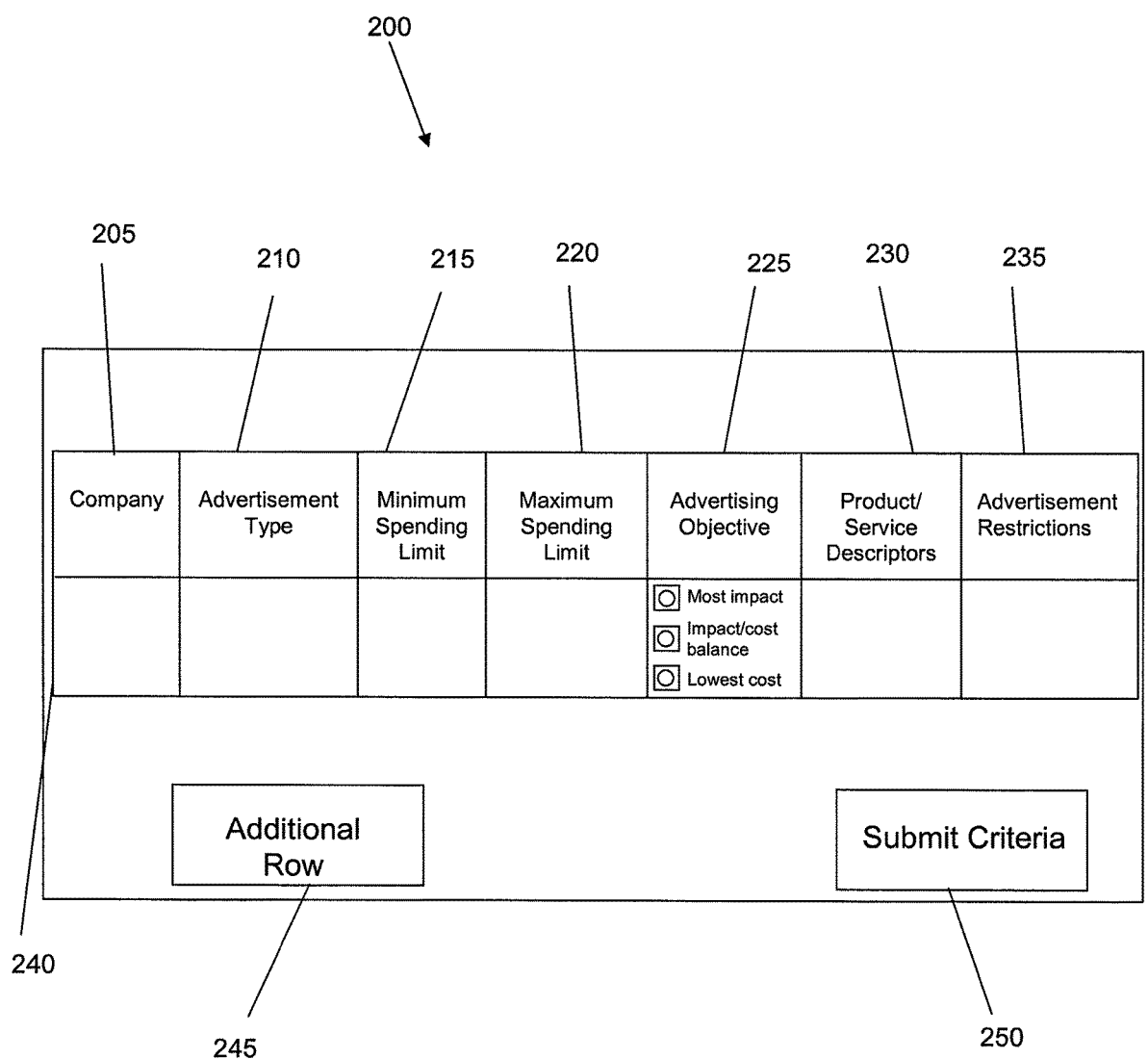
FIG. 2 shows an exemplary criteria submission form according to the invention.

FIG. 2 shows an exemplary advertisement criteria submission form 200 of the criteria collection tool 60. It should be understood that FIG. 2 is one of many potential architectural models for the submission of advertisement criteria to the criteria collection tool 60, and should not limit the scope of the present invention.

The advertisement criteria collection process is embodiment dependant and may occur within or outside of a VU. Outside VU embodiments include the use of a web site to perform advertisement criteria collection. Accordingly, if the advertisement criteria collection process occurs within a VU, the advertisement criteria submission form 200 may be displayed to a user, e.g., an advertiser, within the VU. If the advertisement criteria collection process occurs outside of a VU, the advertisement criteria submission form 200 may be displayed to an advertiser, for example, through a website portal. It should be understood, however, that the invention contemplates manual submissions of advertisement criteria, as well. That is, an advertiser may submit advertisement criteria, e.g., to a VU owner, a VU operator or a service provider via conventional mail or other conventional methods.

As shown in FIG. 2, a company wishing to submit advertisement criteria may supply relevant data in a row 240 of the exemplary advertisement criteria submission form 200. FIG. 2 has fields for "Company" 205, "Advertisement Type" 210, "Minimum Spending Limit" 215, "Maximum Spending Limit" 220, "Advertising Objective" 225, "Product/Service Descriptors" 230, and "Advertisement Restrictions" 235. More specifically, the "Company" field 205 contains data, e.g., an entity identifier, identifying the company submitting the advertisement criteria. In embodiments, the data identifying the company, for example, may be a company name or a unique company identifier. The "Advertisement Type" field 210 contains the data indicating a company's desired advertising type. For example, advertising types may include billboards, 2-dimensional advertisements, 3-dimensional advertisements, animation advertisements, immersive advertisements, product placements advertisements, and combinations thereof, amongst other advertising types. The "Minimum Spending Limit" field 215 contains the company's minimum spending limit for one or more advertisements. The "Maximum Spending Limit" field 220 contains the company's maximum spending limit for one or more advertisements. The "Advertising Objective" field 225 contains data indicative of an advertiser's advertising objectives. For example, in embodiments, the "Advertising Objective" field 225 may include click boxes for indicating "most impact", "impact/cost balance" and/or "lowest cost".

The "Product/Service Descriptors" field 230 contains descriptors of the advertiser's product or service. For example, the advertiser may identify products/services by keywords, that may be cross-referenced with user profiles, as discussed further below.

The "Advertisement Restrictions" field 235 contains any restrictions the company has placed on the advertisements. For example, an advertiser may only be interested in advertising in the VU during specific hours or in specific locations. In embodiments, a user (e.g., an advertiser, VU manager or service provider) may narrow the listing of allowed or desired locations and times for advertising. That is, an advertiser may opt to not advertise, e.g., at a particular VU location. For example, an advertiser of "R" rated movies may not want to advertise in an area of the VU frequently populated by younger crowds. Furthermore, an advertiser may not wish to advertise during particular times, e.g., the morning. In additional embodiments, an advertiser may restrict advertisements on objects that are under control of specific avatars. For example, an advertiser may not want their products associated with avatars (or objects of avatars) having particular qualities or attributes (e.g., avatars having vulgar outfits or younger users). Thus, in embodiments, the advertisement criteria submission form 200 may include one or more "Advertisement Restrictions" fields 235 for inputting restrictions (e.g., temporal, contextual) on the advertising. Accordingly, the advertiser may narrow the listing of advertising locations and/or times for consideration, e.g., by entering restricted advertising locations and/or times in the advertising criteria submission form 200.

For example, an advertiser may identify VU location restrictions by indicating a location UUID in the "Advertisement Restrictions" field 235. A UUID is an identifier standard used in software construction. The intent of UUIDs is to enable distributed systems to uniquely identify information without significant central coordination. Thus, anyone can create a UUID and use it to identify something with reasonable confidence that the identifier will never be unintentionally used by anyone for anything else. Information labeled with UUIDs can therefore be later combined into a single database without needing to resolve name conflicts.

In further embodiments, in order to place location restrictions on their advertisements, an advertiser may use, for example, a two-dimensional image of a VU to selectively block out areas of the VU, in which the advertiser does not wish to place their advertisements. Additionally, an advertiser may move through a VU and click areas in which they do not wish to place their advertisements. These locations may be identified by location UUIDs. This information may be placed in a relational database, relating the advertiser with the restricted area/location UUIDs. Additionally, an advertiser may have global restrictions for all their advertisements, such that a table of global restrictions for that advertiser may be compiled. The cost determination tool 65 and/or the advertisement analysis tool 75 may use these inputted restrictions as described further below.

The invention contemplates that a same user (e.g., company or entity) may submit advertisement criteria, e.g., for different products or services, for multiple advertisement types, and/or for different minimum or maximum spending limits, amongst other advertisement criteria, during a single submission of the advertisement criteria submission form 200. Thus, for example, a user or entity may create additional rows in the advertisement criteria submission form 200 as needed to enter additional advertising criteria by "clicking" an "Additional Row" button 245.

Additionally, the invention contemplates that an advertiser may enter only selected information in the advertising criteria submission form 200. For example, an advertiser may not want to restrict their submission to a particular advertisement type, or may not have a minimum spending limit. Thus, in embodiments, an advertiser may enter select advertising criteria in the advertising criteria submission form 200.

Upon completing (wholly or partially) the advertising criteria submission form 200, a user may submit the advertisement criteria by "clicking" the "Submit Criteria" button 250. Upon receiving the advertising criteria, the criteria collection tool 60 places the advertisement criteria information into a data store, e.g., the database 95. Furthermore, the invention contemplates that the advertising criteria may be changed at any time. That is, for example, an advertiser may change or update information supplied to the criteria collection tool 60 at any time, including in real-time.

Determination of Costs for Each Type of Advertisement

The cost determination tool 65 creates a listing of all possible advertisements types, locations and times in a VU to be considered and determines a cost for each possible advertisement type, location and time. In embodiments, the listing may be stored in the database 95. Moreover, the listing of possible advertising types, locations and times for consideration, for example, may include any current or future advertising methods, including: billboards, immersive advertisements, 2-dimensional live commercials on a screen, a "click-on" advertisement (e.g., a pedestal that can be clicked to initiate commercial), product placements, 3-dimensional advertisements, animations and combinations thereof, amongst other advertising methods or types.

The cost determination tool 65 creates a listing of advertisement locations and times for the different advertisement types and their associated costs by gathering information from the VU and determining information about the possible advertisement types. For example, the cost determination tool 65 may scan a VU and determine what types of advertising spaces are available in the VU, including advertising space locations and times. Additionally, the cost determination tool 65 may determine a cost for those available advertising spaces.

VU users may acquire land, or space, from a VU owner or operator, e.g., by purchasing the land, and may rent advertising space on the land to advertisers. Thus, the cost determination tool 65 may determine the cost of each type of advertisement by determining an amount charged by a VU landowner for each type of advertisement. Additionally, the amount charged by a VU landowner for each type of advertisement may vary by date and time, number of people in area, etc. That is, a landowner (e.g., an advertising space owner) may opt to charge more to place an advertisement in their advertising space if their land is a heavily-frequented region of the VU.

Furthermore, in embodiments, the cost determination tool 65 may determine a cost of each type of advertisement by determining an amount of central processing unit (CPU) power consumed in running the advertisement types, amongst other factors. Different advertisement types are of varying complexity and require varied amounts of CPU computing power. As such, it is contemplated that the amount of CPU computing power required for an advertisement will affect the cost of the advertisement. For example, a 3-dimensional animation advertisement requires more CPU processing power than a 2-dimensional static billboard advertisement, and thus would have a higher associated cost. Thus, the cost determination tool 65 may determine a cost of each type of advertisement by determining an amount of central processing unit (CPU) power consumed in running the advertisement type.

In an exemplary embodiment, in order to determine available advertisement locations, times and types and their associated costs, the cost determination tool 65 may use a Web crawler to gather information from one or more VUs. A Web crawler (also known as a Web spider or Web robot) is a program or automated script which browses the World Wide Web in a methodical, automated manner. Other less frequently used names for Web crawlers include ants, automatic indexers, bots, and worms. The process of using a Web crawler is called Web crawling or spidering. According to an aspect of the invention, the cost determination tool 65 may use spidering, or a Web crawler, to gather up-to-date or real-time data about the costs of available advertising spaces in one or more VUs.

With another implementation, in order to determine available advertisement locations, times and types and their associated costs, the cost determination tool 65 may include a script which solicits from, for example, VU owners or operators, the location and types of available advertising space in the VU. For example, VU users may acquire land, or space, from a VU owner or operator, e.g., by purchasing the land. The VU owner or operator may keep records of the land sale transactions, for example, in a searchable database. Moreover, the land owner may register their land (or a portion thereof) with the VU owner or operator as available for advertising (e.g., in a searchable database) and may rent advertising space on the land to advertisers. Additionally, a land owner may, when registering their land as available for advertising, set a cost for advertising and may place this cost information in, e.g., the searchable database. According to this embodiment, the cost determination tool 65 may include a script which queries, e.g., the VU owner or operator, land owners, and/or the searchable database to determine available advertising locations, times and types, and associated costs.

Additionally, the invention contemplates that the cost determination tool 65 may solicit cost information directly from advertising-space owners in the VU. For example, the cost determination tool 65 may use email or instant messaging (IM) to solicit cost information from advertising-space owners.

Using, for example, the Web crawler or a script, as described above, the cost determination tool 65 may gather relevant information to create a listing of all available advertisements locations, times and types in one or more VUs to be considered and determine a cost for each possible advertisement location, time and type.

Thus, the cost determination tool 65 may determine the cost of each type of advertisement by determining an amount charged by a VU landowner for each type of advertisement. Furthermore, the cost determination tool 65 may determine an amount of central processing unit (CPU) power consumed in running the advertisement types, amongst other factors. Additionally, the amount charged by a VU landowner for each type of advertisement may vary by date and time, number of people in area, etc. Thus, the cost determination tool 75 may operate in real-time to provide up-to-date advertisement cost information.

Historical and Real-Time VU Data Collection

The VU data collection tool 70 may retrieve and/or detect historical and real-time data of the VU and store this data in, e.g., the database 95. In embodiments, the VU data collection tool 70 may retrieve and record historical and real-time data from the VU simulation engine and/or from VU databases, amongst other sources.

In embodiments, the historical data may include, for example, population statistics for different regions of the VU, previous advertisement placements, and/or advertisement success (e.g., number of advertisement "click-throughs" or resulting purchases). Moreover, the population statistics may include detailed demographic profile data including, e.g., gender, inventory, assets, and/or interests, amongst other data. The VU data collection tool 70 may, for example, determine if a VU user (e.g., via an avatar) has seen an advertisement and subsequently decided to purchase the advertised item within a certain period of time (as determined by the VU data collection tool 70 analyzing the user's inventory, surveying, or viewing credit card reports). Thus, the VU data collection tool 70 may determine if the advertisement is an effective advertisement type, in an effective location and/or placed at an effective time. This historical VU data may be used to determine an advertisement impact factor, as set forth further below.

Moreover, this historical VU data may be pertinent not only to the advertiser in question, but also globally to other advertisers in the VU. That is, if the VU data collection tool 70 has determined, for example, that in a particular VU location and time, a certain advertisement type has historically been very effective, as described further below, the advertisement analysis tool 75 may determine a higher advertisement type impact factor for that advertisement type or may assign a higher advertisement location impact factor for that advertisement location when performing the advertisement location/time/type analysis for other advertisers.

In embodiments, the VU data collection tool 70 may also detect real-time data of the VU environment and store the data in, e.g., the database 95. For example, the VU data collection tool 70 may detect events scheduled or taking place in a particular VU location. The VU simulation engine may keep records of scheduled events. Thus, the VU data collection tool 70 may search these records to detect events scheduled or taking place in a particular VU location.

Additionally, the VU data collection tool 70 may detect a number of customers (e.g., avatars) in a particular VU location, and customer profiles of those customers in the particular location at a given time, amongst other real-time data. For example, the VU data collection tool 70 may determine the number of avatars simultaneously viewing, or a number of avatars in the region or area of, an object in the VU by setting a crowdedness indicator measured by the number of avatars per a defined size of area.

Moreover, in embodiments, the VU data collection tool 70 may detect the profiles of customers in a given location. For example, the VU data collection tool 70 may detect customers' assets, gender information, interests, spending habits, amongst other data. In embodiments, the detection of profiles of customers in a given location, for example, may utilize sampling techniques.

Furthermore, the VU data collection tool 70 may detect further historical or real-time VU data. In embodiments, further historical or real-time VU data may include, for example, indications of a VU landowner blocking land from being used for advertising, VU simulation engine unavailability, a VU region becoming overwhelmed (e.g., when there are too many users or objects in a VU region for the simulation engine to run effectively), and/or an amount of lighting occlusion on advertising spaces (e.g., shadows cast on advertising spaces by nearby objects), amongst other historical and real-time VU data. This further historical or real-time VU data may identify VU spaces that may currently be unavailable or less desirable as advertising spaces.

Determine Best Match Between Advertisement Criteria and Advertisement Options The advertisement analysis tool 75 iterates through the advertisement criteria information, the collected cost data and the VU data to find best match between the possible advertisement methods, times and locations and the determined advertisement criteria. For example, in embodiments, the advertisement analysis tool 75 may, for each advertising location, advertising time and advertisement type, calculate an expected impact and benefit of an available advertisement choice (e.g., how strong of a match between advertisement topic and location/customer profile, etc.), and identify optimal combinations of advertising location, time and type to meet the advertising criteria.

In one exemplary embodiment, the advertisement analysis tool 75 may determine all available advertising spaces in the VU capable of supporting advertising types which match the advertising type set forth by the advertiser via the criteria collection tool 60. That is, if an advertiser indicated billboard advertising spaces as the advertising type, then the advertisement analysis tool would determine all available advertising spaces in the VU capable of supporting a billboard advertisement. If an advertiser did not indicate any preference for a particular type of VU advertisement, the advertisement analysis tool 75 may determine all available advertising spaces in the VU, without regard for the advertising type.

Next, the advertisement analysis tool 75 may remove any available advertising spaces subject to an advertiser's advertisement restrictions. That is, as explained above, an advertiser may not want to advertise in, for example, particular areas of a VU or at particular times, or may not want their advertisements associated with certain owners of advertising space. Thus, the advertisement analysis tool 75 may remove those available advertising spaces from consideration. For each remaining advertising space, the advertisement analysis tool 75 may gather the cost information determined by the cost determination tool 65.

Additionally, for each remaining advertising space, the advertisement analysis tool 75 may determine an advertisement impact factor. In embodiments, for example, the advertisement impact factor may be a value between zero and one, and may be determined according to equation (1), by determining the product of an advertisement location factor, an advertisement time factor and an advertisement type factor.

$$\text{advertisement impact factor} = \text{advertisement location factor} \times \text{advertisement time factor} \times \text{advertisement type factor} \qquad (1)$$

In embodiments, the advertisement analysis tool 75 may determine the advertisement location factor based upon the location of the available advertisement space and a comparison of the advertiser's identified product/service descriptors and the interests of the VU residents. More specifically, the advertisement location factor may be a value between zero and one. The advertisement analysis tool 75 may determine the advertisement location factor by accounting for the location of the available advertising space, which, for example, may include historical population data for the area of the VU in which the advertising space is located, historical data for views of the advertising space, real-time population size data, land-owner blocks on advertising, VU simulation engine availability, and lighting occlusion of the advertising space, as determined by the VU data collection tool 70, amongst other factors. For example, in embodiments, an advertising space in an area of the VU having a higher real-time population may have a higher advertising location factor. Additionally, an advertising space in an area of the VU having a higher historical population may have a higher advertising location factor.

Additionally, the advertisement analysis tool 75 may determine the advertisement location factor by accounting for a real-time matching between product/service descriptions input via the criteria collection tool 60 and the current VU population interests. For example, in order to determine the expected impact and benefit of the advertisement choice, the advertisement analysis tool 75 may use keyword matches between the detected customer profiles and the advertiser's indicated product/service descriptors. That is, the advertisement product/service description data collected via the criteria collection tool 60 and stored in the database 95 may be compared with keywords in customer profiles collected by the VU data collection tool 70 to determine if the advertisement topics have some degree of match with the customer profiles for customers in a region of the VU. In embodiments, a greater degree of matching would increase the advertising location factor and a lesser degree of matching would decrease the advertising location factor.

Furthermore, the advertisement time factor may be a value between zero and one. The advertisement analysis tool 75 may determine the advertisement time factor by accounting for the time within the VU in the region of the advertising space. In embodiments, determining the advertisement time factor may include accounting for time of day in the VU and high activity times in the VU, amongst other factors. For example, if an area of the VU historically (as determined by the VU data collection tool 70) has a large number of users (e.g., avatars) during a certain time period (e.g., 3-5 PM), the advertisement time factor may be increased. Moreover, a daytime advertisement may likely have more viewers than a nighttime advertisement. Accordingly, in embodiments, an advertisement time factor may be higher for daytime versus nighttime. However, the invention contemplates that an advertiser may prefer nighttime advertisements (as indicated via the criteria collection tool 60). Thus, in such situations, a nighttime advertisement may have a higher advertisement time factor.

The advertisement type factor may be a value between zero and one. The advertisement analysis tool 75 may determine the advertisement type factor by accounting for the relative effectiveness of a particular type of VU advertisement versus other types of VU advertisements. For example, the advertisement analysis tool 75 may assign an advertisement type factor according to the values set forth below in TABLE 1.

TABLE 1

| Advertisement Type | Advertisement Type Factor |
| --- | --- |
| Billboard | 0.2 |
| Animated billboard | 0.4 |
| 3-dimensional animation | 0.8 |
| Product placement | 0.7 |
| "click-on" item | 0.2 |
| Immersive advertisement | .9 |

It should be understood that TABLE 1 is an exemplary embodiment, and the invention contemplates other methods of determining an advertisement type factor. Moreover, the advertisement type factor values are exemplary, and the invention contemplates other advertisement type factor values. As such, the invention should not be construed as being limited in scope by the exemplary embodiments.

In order to determine the impact of an advertisement relative to its cost, the advertisement analysis tool 75 may determine, for each available advertising space, an impact/cost ratio, according to equation (2).

$$\text{impact/cost ratio} = \text{advertisement impact factor/cost} \quad (2)$$

Moreover, in embodiments, the advertisement analysis tool 75 may compile, for example, three list of the remaining potential advertising spaces. More specifically, the advertisement analysis tool 75 may rank the list of potential advertising spaces by advertising impact factor, such that the advertising space with the highest advertising impact factor is ranked highest. Furthermore, the advertisement analysis tool 75 may rank the list of potential advertising spaces by cost, such that the advertising space with the lowest cost is ranked highest. Additionally, the advertisement analysis tool 75 may rank the list of potential advertising spaces by impact/cost ratio, such that the advertising space with the highest impact/cost ratio is ranked highest. These ranked lists may be stored in the database 95. As described above, an advertiser may submit criteria for different advertisement types. Thus, in embodiments, these ranked lists may be segmented by advertisement type.

Display Results or Launch Advertisement

The advertisement launch tool 80 may either automatically launch a recommended advertisement type in a recommended location at a recommended time, or may display the advertisement determination results and allow human to initiate the advertisement. More specifically, the advertisement launch tool 80 may present one or more of the ranked lists to an advertiser depending upon the advertising objective input via the criteria collection tool 60. For example, with the criteria collection tool 60 configured such that an advertiser indicates an advertising objective by selecting one of "most impact", "impact/cost balance", and "lowest cost", the advertisement launch tool 80 may present the advertiser with one of the ranked lists depending on the advertiser's advertising objective.

For instance, if the advertiser indicated "most impact" as an advertising objective, the advertiser is interested in those advertising spaces and methods that achieve a high impact and the advertiser is less concerned with cost. Thus, according to the invention, the advertisement analysis tool 75 may use the impact factor ranked list to determine an optimized advertising location, time and type and the advertisement launch tool 80 may either present the impact factor ranked list to the advertiser or be automatically launch, e.g., the top-ranked advertisement in accordance with the recommended location, time and method.

If the advertiser has indicated "lowest cost" as an advertising objective, the advertiser is interested in those advertising spaces and methods that have a low cost and the advertiser may be less concerned with advertising impact. Thus, according to the invention, the advertisement analysis tool 75 may use the cost ranked list to determine an optimized advertising location, time and type.

Furthermore, if the advertiser has indicated "impact/cost balance" as an advertising objective, the advertiser is interested in those advertising spaces and methods that have a high impact per cost. Thus, according to the invention, the advertisement analysis tool 75 may use the impact/cost ratio ranked list to determine an optimized advertising location, time and type.

If an advertiser has selected an automatic launch of the advertisement, the advertisement launch tool 80 may automatically launch the advertisement in the VU. In embodiments, the advertisement launch tool 80 may automatically launch the top-ranked combination of advertising location, time and method. If an advertiser has not selected an automatic launch of the advertisement, the advertisement launch tool 80 may present the advertiser with a ranked list, so that the advertiser may select an advertising location, time and type from the list.

FIG. 3 shows an exemplary advertisement determination results output table 300 of the advertisement launch tool 80, displaying a list of potential advertising spaces for a particular advertiser and their associated costs, advertising impact ranks and cost/impact ratios. More specifically, table 300 includes columns for "Advertisement Type" 305, "Advertisement Location UUID" 310, "Advertisement Cost" 315, "Advertising Impact Factor" 320, and "Cost/Impact Ratio" 325. Moreover, table 300 includes a row 340 for each potential advertising location (identified by the advertisement location UUID).

As shown in FIG. 3, the advertisement determination results table 300 may be segmented by advertisement type. With this exemplary embodiment, an advertiser is interested in billboard advertisements 330 and 3-dimensional animation advertisements 335 (as indicated via the criteria collection tool 60). However, the invention contemplates that, in embodiments, the different advertisement types may not be segmented.

Furthermore, as shown in FIG. 3, the potential advertisement locations are ranked according to advertisement cost. Thus, with this exemplary embodiment, the advertiser has selected "low cost" as an advertising objective (via the criteria collection tool 60). If the advertiser selects "highest impact" as the advertising objective, the data of table 300 may be reordered by the advertisement analysis tool 75 and displayed by the advertisement launch tool 80, such that the advertising locations are listed according to advertising impact ranks. Additionally, if the advertiser selects "impact/cost balance" as the advertising objective, the data of table 300 may be reordered by the advertisement analysis tool 75 and displayed by the advertisement launch tool 80, such that the advertising locations are listed according to impact/cost ratios.

Real-Time Analysis

The invention contemplates that determined costs and VU parameters may change in real-time, such that the determinations of the advertisement analysis tool 75 may also change in real-time. Thus, in embodiments, the cost determination tool 65, the VU data collection tool 70 and/or advertisement analysis tool 75 may be constantly running, such that pertinent data indicative of VU parameters may be collected and utilized in real-time to provide current optimized combinations of advertising locations, times and types.

For example, the VU data collection tool 70 may detect a concert being played. Additionally, the VU data collection tool 70 may determine the genre of the concert and the advertisement analysis tool 75 may determine that the genre matches the advertisement descriptors (as input via the criteria collection tool 60). Thus, the advertisement analysis tool 75 may determine in real-time that an advertisement in an area of the concert would increase the advertisement location impact factor and/or the advertisement time impact factor. Moreover, as explained above, the advertisement launch tool 80 may display those results to an advertiser in real-time or automatically launch an advertisement in a region of the VU near the concert.

As a further example, if an area recommended for advertisements is becoming empty of potential customer avatars (as determined by a real-time data collection by the VU data collection tool 70), then the advertisement analysis tool 75 may determine that a currently running advertisement (e.g., a more expensive 3-dimensional animation advertisement) is no longer optimal. That is, the advertisement analysis tool 75 may determine that, due to the lower numbers of potential customer avatars, the advertisement location impact factor and/or the advertisement time impact factor is now lower. Consequently, using equation (1), the advertisement analysis tool may determine, in real-time, that the advertisement impact factor is now lower. Accordingly, as explained above, the advertisement launch tool 80 may display new results to an advertiser, for example, indicating that a switch to a cheaper billboard option (versus the more expensive 3-dimensional animation advertisement) may be the best advertising option to meet the advertiser's criteria.

As an additional example, the VU data collection tool 70 may determine, in real-time, that an area normally used for advertisements has been blocked by a landowner. For example, the area may now be reserved for a special event. Thus, the advertisement analysis tool 75 may determine (and the advertisement launch tool 80 may display) an updated advertisement determination results output table indicating updated optimized advertising locations, times and methods. For example, the advertisement analysis tool 75 may determine that an advertiser's objectives may best be met by using a billboard advertisement or by relocating the currently running advertisement to a new location in the VU.

Sensitivity Analysis

According to a further aspect of the invention, the advertisement analysis tool 75 may allow a user (e.g., an advertiser) to perform a sensitivity analysis by running "what if" scenarios. That is, a user may alter assumptions or advertising parameters (e.g., advertising criteria) via the criteria collection tool 60 and re-run the analysis of the advertisement analysis tool 75. By implementing this aspect of the invention, since all relevant data has already been collected, this allows a user to quickly perform analyses on additional advertising scenarios to optimize the advertisement in the VU.

For example, the advertisement analysis tool 75 may have determined that for a set of detected and entered parameters, a particular location is not optimal (e.g., the location is too expensive to be optimal). Thus, a user may vary the maximum spending limit for a type (or method) of advertisement (e.g., an immersive advertisement) for that particular VU location in the criteria collection tool 60. With the varied parameters input, the advertisement analysis tool 75 may then determine if the advertisement would be optimal.

Flow Diagrams

The steps of the flow diagrams described herein may be implemented in the environment of FIG. 1. The flow diagrams may equally represent high-level block diagrams of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 4:
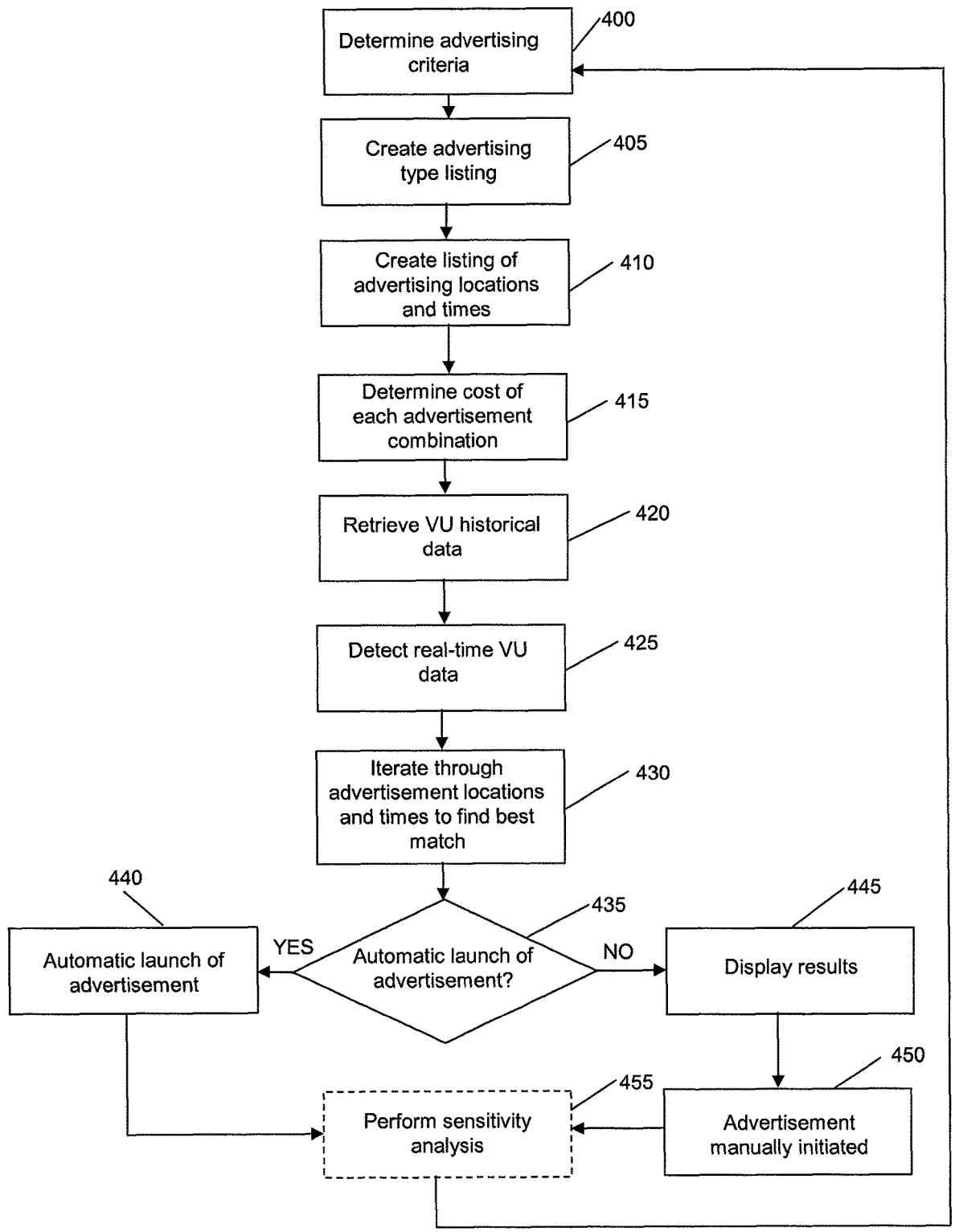
FIGS. 4 and 5 are exemplary flow chart of steps for implementing aspects of the invention.

FIG. 4 shows an exemplary flow chart for performing steps of the invention. It should be understood that, as FIG. 4 is an exemplary flow chart, it should not limit the scope of the invention.

At step 400, a user determines the advertising criteria and inputs the criteria via the criteria collection tool. At step 405, the cost determination tool creates a listing of all possible advertising types to be considered. At step 410, the cost determination tool creates a listing of all available advertising locations and times to be considered. At step 415, the cost determination tool calculates the cost of each type of advertisement in each available advertising location and time.

At step 420, the VU data collection tool retrieves historical data of the VU. At step 425, the VU data collection tool detects real-time data of the VU environment. At step 430, for each location, time and advertisement type, the advertisement analysis tool iterates through to find a best match between the possible advertisement and the advertiser's advertising criteria. At step 435, a determination may be made to automatically launch the advertisement recommended by the advertisement analysis tool. If, at step 435, a determination was made to automatically launch the advertisement, at step 440, the advertisement launch tool automatically launches the advertisement in the VU in accordance with the recommended advertisement parameters (e.g., location, time and type). If, at step 435, a determination was made to not launch the recommended advertisement automatically, at step 445, the advertisement launch tool may display the recommended advertisement parameters to the user for the user to initiate an advertisement. At step 450, the user may initiate the advertisement in accordance with the recommended advertisement parameters via the advertisement launch tool. At step 455, a user may utilize the advertisement analysis tool to perform a sensitivity analysis by running "what if" scenarios, wherein advertisement parameters are varied (e.g., via the criteria collection tool) and optimal advertisement methods, times and locations are determined with the varied parameters, wherein the process continues at step 400. In embodiments, step 455 is an optional step and is indicated as such by dashed lines.

It should be understood, that while the steps have been described as occurring in a particular order, the invention contemplates that the steps may be performed in other orders. For example, step 425 may occur prior to step 420. Furthermore, the invention contemplates that, in embodiments, steps may be implied or omitted while still remaining true to this invention.

Additionally, at an end of a session (or at any time), the advertisement analysis tool 75 may record, e.g., in the database 95, statistics, for example, on the number of advertisement types, the locations and times of the advertisements, the number of resulting sales, amongst other statistical data. The advertisement analysis tool 75 may utilize the recorded statistics for compensation purposes. For example, the advertisement analysis tool 75 may keep track of which products were successfully advertised, e.g., generated a response from a potential customer avatar, so that compensation may be paid, or remunerated for placing the advertisement.

Figure 5:
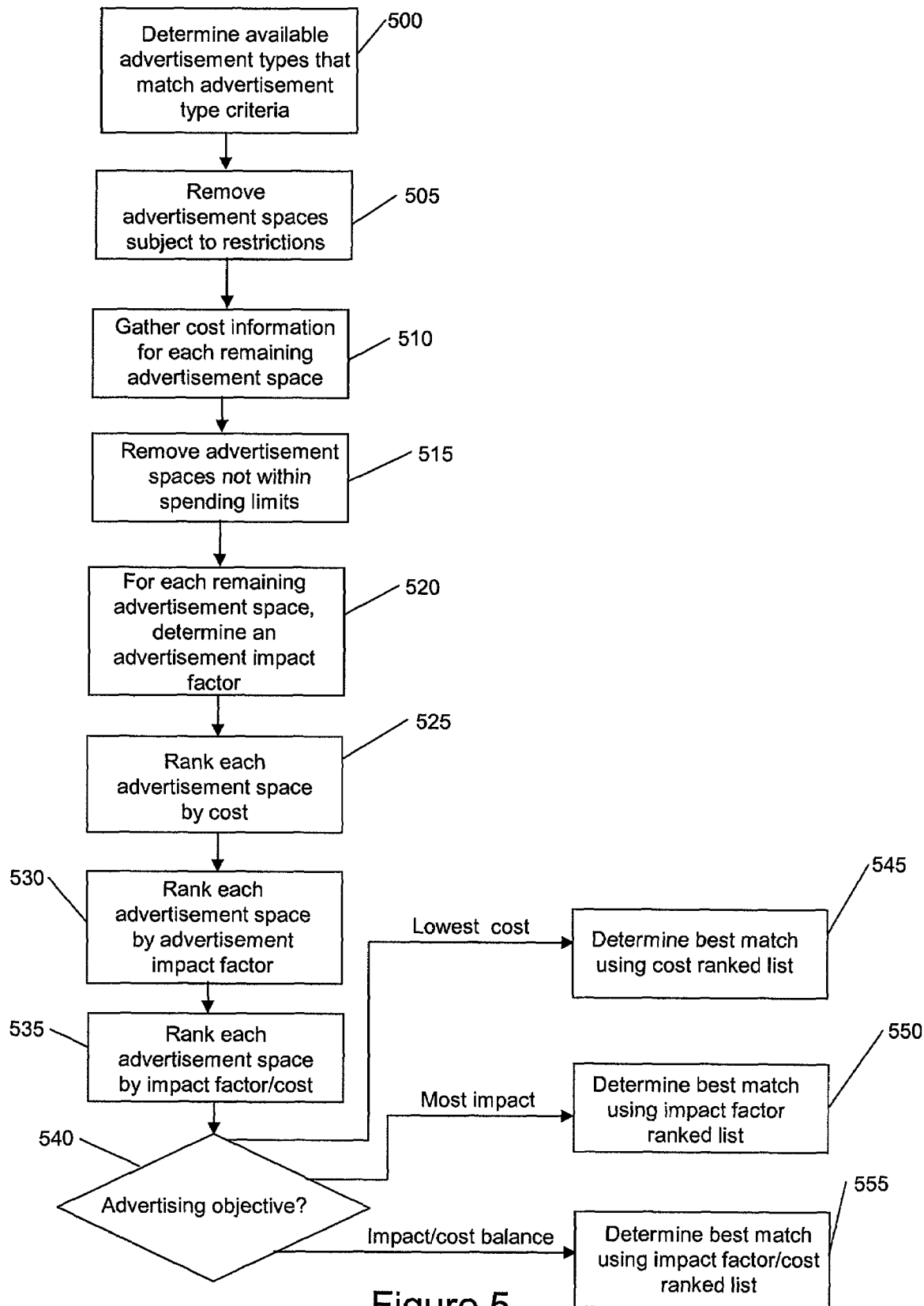

FIG. 5 shows an exemplary flow chart for performing steps of the invention. More specifically, FIG. 5 shows an exemplary flow chart for iterating through the potential advertisement locations and times to find an optimized match between an advertiser's criteria and the available advertising spaces in a VU. It should be understood that, as FIG. 5 is an exemplary flow chart, it should not limit the scope of the invention.

At step 500, the advertisement analysis tool determines the available advertisement spaces in the VU that are capable of supporting an advertising type which matches the advertisement type criteria (as indicated via the criteria collection tool). At step 505, the advertisement analysis tool removes any potential advertising spaces that are subject to restrictions, e.g., time restrictions, contextual restrictions, location restrictions, etc. (as indicated by the criteria collection tool). At step 510, the advertisement analysis tool may gather cost information (as determined by the cost determination tool) for each remaining advertisement space from the cost determination tool or the database. At step 515, the advertisement analysis tool removes any potential advertising spaces that are not within the advertiser's minimum and maximum spending limits (as indicated via the criteria collection tool).

At step 520, for each remaining potential advertising space, the advertisement analysis tool determines an advertisement impact factor. At step 525, the advertisement analysis tool ranks the potential advertising spaces by cost. At step 530, the advertisement analysis tool ranks the potential advertising spaces by advertisement impact factor. At step 535, the advertisement analysis tool ranks the potential advertising spaces by impact/cost ratio. At step 540, the advertisement analysis tool determines the advertiser's advertising objective (as indicated via the criteria collection tool).

If, at step 540, the advertisement analysis tool determines the advertiser's advertising objective is "lowest cost", the process continues at step 545. At step 545, the advertisement analysis tool uses the cost ranked list to determine an optimal advertising location, timing and type. If, at step 540, the advertisement analysis tool determines the advertiser's advertising objective is "most impact", the process continues at step 550. At step 550, the advertisement analysis tool uses the impact factor ranked list to determine an optimal advertising location, timing and type.

If, at step 540, the advertisement analysis tool determines the advertiser's advertising objective is "impact/cost balance", the process continues at step 555. At step 555, the advertisement analysis tool uses the impact factor/cost ranked list to determine an optimal advertising location, timing and type.

It should be understood, that while the steps have been described as occurring in a particular order, the invention contemplates that the steps may be performed in other orders. For example, step 525 may occur prior to step 520. Furthermore, the invention contemplates that, in embodiments, steps may be implied or omitted while still remaining true to this invention.

While the invention has been described in terms of embodiments, those skilled in the art will recognize that the invention can be practiced with modifications and in the spirit and scope of the appended claims.

What is claimed is:

1. A method implemented in a computer infrastructure having computer executable code for displaying advertisements at particular locations and at particular times in a virtual universe (VU) comprising:
   receiving advertising criteria;
   collecting advertisement cost data by gathering information from the virtual universe (VU), wherein the VU comprises a computer-based simulated environment configured to permit users to traverse and interact using avatars;
   detecting VU data, wherein the VU data includes historical and real-time VU data;
   scanning the historical and real-time VU data to determine available advertising locations, advertising times and advertising types and to identify VU spaces that may currently be unavailable or undesirable for advertising purposes;
   determining optimal advertisement parameters based on the advertising criteria, the advertisement cost data and the VU data;
   analyzing the optimal advertisement parameters with an advertisement analysis tool to recommend automatically launching an advertisement in a particular location and at a particular time in the VU, in accordance with the optimal advertisement parameters;
   displaying the optimal advertisement parameters on a display device to initiate launching the advertisement in the particular location and at the particular time in the VU by the user in accordance with the optimal advertisement parameters when the advertisement analysis tool does not recommend automatically launching the advertisement in the VU; and
   performing a sensitivity analysis by running "what if" scenarios, wherein advertising parameters are varied via a criteria collection tool, and optimal advertisement methods, times and locations for optimal VU spaces for advertising are determined with the varied advertising parameters.

2. The method of claim 1, wherein the advertising criteria comprises:
   an entity identifier;
   an advertising objective; and
   at least one of:
      one or more advertisement types;
      a minimum spending limit;
      a maximum spending limit;
      one or more product/service descriptors; and
      one or more advertisement restrictions.

3. The method of claim 2, wherein the advertising objective is one of:
  most impact;
  lowest cost; and
  impact/cost balance; and
  quantified on a numeric scale.

4. The method of claim 1, further comprising performing a sensitivity analysis.

5. The method of claim 1, wherein the collecting the advertisement cost data comprises:
  determining a cost for each combination of the available advertising locations, the advertising times and the advertising types; and
  creating a list of the combinations of the available advertisement locations, the advertisement times and the advertisement types with associated determined costs.

6. The method of claim 5, wherein the determining the cost for each combination of the available advertising locations, the advertising times and the advertising types comprises at least one of:
  determining an amount charged for the combination of the advertising location, the advertising time and the advertising type; and
  determining an amount of central processing unit (CPU) power consumed by the combination of the advertising location, the advertising time and the advertising type.

7. The method of claim 6, wherein the determining the cost for each combination of the available advertising locations, the advertising times and the advertising types comprises using at least one of:
  a web crawler;
  a script;
  instant messaging;
  accessing a database; and
  electronic mail.

8. The method of claim 1, wherein the VU data comprises at least one of:
  historical VU data, which includes at least one of:
    population statistics for a region of the VU;
    demographic customer profile data;
    previous advertisement placements;
    previous advertisement successes; and
    customer interests; and
  real-time VU data, which includes at least one of:
    scheduled VU events;
    currently occurring VU events;
    an amount of customers in the region of the VU;
    profiles of customers in the region of the VU; and
    an amount of customers in the region of the VU currently viewing a VU advertisement space.

9. The method of claim 1, wherein the optimal advertisement parameters comprise a combination of at least two of:
  an advertising location;
  an advertising time; and
  an advertising type.

10. The method of claim 1, wherein the determining the optimal advertisement parameters comprises:
  determining available advertisement spaces capable of supporting advertising types in the VU that match the advertising criteria;
  eliminating from consideration advertisement spaces subject to one or more advertising restrictions;
  gathering the advertisement cost data for each remaining advertising space;
  eliminating from consideration the advertisement spaces whose cost is not within spending limits; and
  for each remaining advertisement space, determining an advertisement impact factor.

11. The method of claim 10, wherein the determining the advertisement impact factor comprises determining at least one of:
  an advertisement location factor;
  an advertisement time factor; and
  an advertisement type factor.

12. The method of claim 11, wherein the determining the advertisement impact factor further comprises determining a product of at least two of:
  the advertisement location factor;
  the advertisement time factor; and
  the advertisement type factor.

13. The method of claim 11, wherein the determining the advertisement location factor comprises accounting for at least one of:
  historical population data for a VU area;
  historical data quantifying a number of views of advertising space;
  real-time population data for the VU area;
  real-time data quantifying a number of current views of the advertising space;
  a matching between product/service descriptors and historic VU population interests; and
  a matching between product/service descriptors and current VU population interests.

14. The method of claim 11, wherein the determining the advertisement time factor comprises accounting for at least one of:
  a time of day in the VU;
  one or more high activity times in the VU; and
  a matching between the one or more advertising restrictions and the time of day in the VU.

15. The method of claim 11, wherein the advertisement type factor is based on an advertisement type, and wherein the advertisement type comprises one of:
  a billboard advertisement;
  a two-dimensional advertisement;
  a "click on" advertisement;
  a three-dimensional advertisement;
  a product placement advertisement;
  an animated advertisement;
  an immersive advertisement; and
  combinations thereof.

16. The method of claim 10, further comprising:
  creating a cost ranking, wherein each remaining advertising space is ranked by cost;
  creating an impact ranking, wherein each remaining advertising space is ranked by the advertisement impact factor; and
  creating a cost/impact ranking, wherein each remaining advertising space is ranked by a quotient of the advertisement impact factor divided by the cost.

17. The method of claim 16, wherein the at least one of displaying the optimal advertisement parameters and invoking the advertisement in accordance with the optimal advertisement parameters further comprises utilizing one of the cost ranking, the impact ranking and the cost/impact ranking in accordance with the advertising criteria.

18. The method of claim 17, wherein:
  if the advertising criteria indicates an advertising objective as lowest cost, then utilizing the cost ranking;
  if the advertising criteria indicates the advertising objective as highest impact, then utilizing the impact ranking; and if the advertising criteria indicates the advertising objective as cost/impact balance, then utilizing the cost/impact ranking.

19. The method of claim 1, wherein a service provider at least one of creates, maintains, deploys and supports the computer infrastructure that performs the steps of claim 1.

20. The method of claim 1, wherein steps of claim 1 are provided by a service provider on a subscription, advertising, and/or fee basis.

21. A computer system for displaying advertisements at particular locations and at particular times in a virtual universe (VU), comprising:
- a processor, a computer readable memory and a computer readable storage media;
- first program instructions to receive advertising criteria;
- second program instructions to determine costs for one or more combinations of advertising locations, advertising times and advertising types by gathering information from the virtual universe (VU), wherein the VU comprises a computer-based simulated environment configured to permit users to traverse and interact using avatars;
- third program instructions to detect VU data, wherein the VU data includes historical and real-time VU data;
- fourth program instructions to determine optimal advertisement parameters based on the advertising criteria, the costs and the VU data;
- fifth program instructions analyze the optimal advertisement parameters with an advertisement analysis tool to recommend automatically launching an advertisement in a particular location and at a particular time in the VU, in accordance with the optimal advertisement parameters;
- sixth program instructions to display the optimal advertisement parameters on a display device to initiate launching the advertisement in the particular location and at the particular time in the VU by the user in accordance with the optimal advertisement parameters when the advertisement analysis tool does not recommend automatically launching the advertisement in the VU; and
- seventh program instructions to perform a sensitivity analysis after the launching of the advertisement by running "what if" scenarios, wherein advertising parameters are varied via a criteria collection tool, and optimal advertisement methods, times and locations for optimal VU spaces for advertising are determined with the varied advertising parameters;
- wherein the first, second, third, fourth, fifth, sixth and seventh program instructions are stored on the computer readable storage media for execution by the processor via the computer readable memory,
- further comprising program instructions to scan the historical and real-time VU data to determine available advertising locations, advertising times and advertising types and to identify VU spaces that may currently be unavailable or undesirable for advertising purposes prior to the fourth program instructions.

22. The system of claim 21, comprising a computer infrastructure operable to implement the criteria collection tool, the cost determination tool, the VU data collection tool, the advertisement analysis tool and the advertisement launch tool.

23. The system of claim 22, wherein a service provider at least one of creates, maintains, deploys and supports the computer infrastructure.

24. A computer program product comprising a computer usable tangible medium comprised of a hardware storage device having readable program code embodied in the tangible medium, the computer program product includes at least one component operable to perform the following operations for displaying advertisements at particular locations and at particular times in a virtual universe (VU):
- receive advertising criteria;
- determine cost data by gathering information from the virtual universe (VU), wherein the VU comprises a computer-based simulated environment configured to permit users to traverse and interact using avatars;
- detect VU data, wherein the VU data includes historical and real-time VU data;
- scan the historical and real-time VU data to determine available advertising locations, advertising times and advertising types and to identify VU spaces that may currently be unavailable or undesirable for advertising purposes;
- determine an optimal combination of advertising location, advertising time and advertising method based on the advertising criteria, the cost data and the VU data;
- analyze the optimal combination of advertising location, advertising time and advertising method based on the advertising criteria, the cost data and the VU data with an advertisement analysis tool to recommend automatically launching an advertisement in a particular location and at a particular time in the VU, in accordance with the optimal advertisement parameters;
- display the optimal combination combination of advertising location, advertising time and advertising method based on the advertising criteria, the cost data and the VU data on a display device to initiate launching the advertisement in the particular location and at the particular time in the VU by the user in accordance with the optimal advertisement parameters when the advertisement analysis tool does not recommend automatically launching the advertisement in the VU; and
- perform, after the launching of the advertisement, a sensitivity analysis by running "what if" scenarios, wherein advertising parameters are varied via a criteria collection tool, and optimal advertisement methods, times and locations for optimal VU spaces for advertising are determined with the varied advertising parameters.

25. A method for displaying advertisements at particular locations and at particular times in a virtual universe (VU) comprising the computer implemented steps of:
- receiving advertising criteria;
- determining cost data by gathering information from a virtual universe (VU), wherein the VU comprises a computer-based simulated environment configured to permit users to traverse and interact using avatars;
- detecting VU data, wherein the VU data includes historical and real-time VU data;
- scanning the historical and real-time VU data to determine available advertising locations, advertising times and advertising types and to identify, via an advertisement analysis tool, VU spaces that may currently be unavailable or undesirable for advertising purposes based upon restrictions indicated by a criteria collection tool;
- removing the VU spaces from consideration for advertising that have been identified as unavailable or undesirable for advertising purposes;
- determining optimal advertisement parameters based on the advertising criteria, the cost data and the VU data;

analyzing the optimal advertisement parameters with the advertisement analysis tool to recommend automatically launching an advertisement in a particular location and at a particular time in the VU, in accordance with the optimal advertisement parameters;

displaying the optimal advertisement parameters on a display device to initiate launching the advertisement in the particular location and at the particular time in the VU by the user in accordance with the optimal advertisement parameters when the advertisement analysis tool does not recommend automatically launching the advertisement in the VU; and performing a sensitivity analysis by running "what if" scenarios, wherein advertising parameters are varied via the criteria collection tool, and optimal advertisement methods, times and locations for optimal VU spaces for advertising are determined with the varied advertising parameters.

26. The method of claim 1, wherein:

the information gathered comprises costs for available advertising locations within the VU, costs for available advertising times within the VU, and costs for available advertising types within the VU;

the advertising locations being at least one object within the VU that comprises a universally unique identifier (UUID); and the information is gathered by scanning the VU.

27. The method of claim 26, wherein the scanning of the VU comprises:

using a web crawler to determine the costs for the available advertising locations in the VU; and using a solicitation script that queries VU land owner's and searches searchable databases of VU land transactions to determine the available advertising locations, times and types, and the associated costs.

* * * * *